United States Patent Office 2,863,855
Patented Dec. 9, 1958

2,863,855

METHOD OF MAKING POLYESTER COMPOSITION

Christopher L. Wilson, Cranberry Lake, N. Y., and Calvin J. Benning, Mahwah, N. J., assignors to Hudson Foam Plastics Corporation, Yonkers, N. Y.

No Drawing. Application July 25, 1955
Serial No. 524,282

7 Claims. (Cl. 260—75)

This invention relates to methods for making polyester compositions and, more particularly, to methods for improving such compositions by lowering the acid number thereof.

Polyesters are usually made by heating a dibasic acid such as phthalic, terephthalic, adipic, succinic, pimelic, maleic acids, or the like, with a polyhydroxy compound such as ethylene glycol, propylene glycol, glycerol, sorbitol and the like. The reaction temperature is usually above 200° C. and separation of water from the reaction mixture is continued until the desired degree of condensation is attained. Such point is frequently determined by viscosity measurements, but it is also desirable that certain hydroxyl and carboxyl values be attained.

By suitable choice of carboxyl and hydroxyl groups, the resulting esters may possess enhanced thermal stability.

Polyesters having terminal hydroxyl groups are increasingly important in the manufacture of rigid and flexible foams, polyurethanes and molded or laminated products derived therefrom.

In the several applications of such polyester compositions it is important that the number of carboxyl and hydroxyl groups in a molecule, be controlled within fairly narrow limits. For example, in polyurethane elastomers, it is important that the free carboxyl groups in the molecule be kept at a minimum. With the elastomers, free carboxyl groups results in undesirable gas bubbles. In foamed compositions, the pores or cells are made by reaction of the free carboxyl groups and/or water with isocyanates while simultaneously, the hydroxyl groups react with the polyisocyanates to form chain linkages. The number of carboxyl groups in this case determine to some extent the density of the finished foam product.

It is thus important that the number of both carboxyl and hydroxyl groups be carefully controlled. Usually this is done by selecting certain ratios of the reactants. For example, a low carboxyl value is attained by using excess glycol reactant and, if necessary, removing the excess reactant after the desired degree of condensation has been reached, by vaporization.

An object of this invention is to provide an improved method of reducing or eliminating entirely, the number of carboxyl groups in a polyester molecule. To this end, the carboxyl groups are reacted with organic oxides such as ethylene oxide, substituted ethylene oxides or the like, replacing such carboxyl groups with a hydroxyalkyl ester group. Such reaction may be indicated as follows:

wherein $R_1$, $R_2$, $R_3$ may be aryl, alkyl, aralkyl, hydrogen or cycloaliphatic radicals.

To carry out the process of the instant invention, the polyester and organic oxide are mixed and heated in the presence, preferably of a catalyst. The catalyst speeds up the reaction or is effective so that the same may be carried out at a reduced temperature. The reactants are combined in proper ratio so as to produce the desired reduction in acid number. If a very small acid number is desired or if such number is to be reduced to zero, the organic oxide may be used in excess. The theoretical amount of oxide may be calculated from the indicated reaction. For complete, or nearly complete removal of carboxyl groups, an excess of about 20% of the organic oxide is used. After the indicated reaction is completed, remaining oxide is removed by vaporization, preferably in a vacuum.

With a prolongation of the reaction, the excess ethylene oxide combines more slowly with the terminal hydroxyl groups. In accordance with the instant invention, it has been found that the ethylene oxide preferentially reacts with the carboxyl rather than the hydroxyl groups.

In the practice of the instant invention, the polyester may be made by the reaction of a polyhydroxy compound or a mixture of such compounds with a dibasic acid. Polyester materials useful in making foamed products are disclosed in the copending application Ser. No. 442,195, for Methods of Making Viscous Liquid Polyester Resins, filed July 8, 1954, by Wilson and Hammon. In said application, the polyesters disclosed therein have molecular weights above 1000 and acid numbers, for some uses, preferably below 100. With the present invention, it is possible to readily reduce the acid numbers from values of 100 or more, to 10 or less, and preferably, below 1.0.

The "acid number" or "acid value" as used herein, is defined as the number of milligrams of potassium hydroxide necessary to neutralize one gram of polyester. Similarly, the "hydroxyl number" or "hydroxyl value" is defined by a hypothetically analagous neutralization factor in milligrams of potassium hydroxide. If the "acid number" of a given resin is $a$, then the weight of ethylene oxide of molecular weight M necessary to theoretically react completely with the carboxyl groups in one gram of resin will equal $$\frac{Ma}{56,000}$$

Reduction of an acid number to any predetermined value may be similarly calculated.

Since ethylene oxide is a low boiling liquid, it is conveniently introduced into the polyester as a vapor. Substituted ethylene oxides are usually volatile liquids and may tend to escape from the reaction mixture, particularly at elevated temperatures, unless precautions are taken to avoid such loss of oxide. Thus, the reaction may be carried out under pressure or under conditions which permit the unreacted oxide to be continually returned to the reaction vessel, as by means of a reflux condenser.

Catalysts may be used in the reaction and may be acidic in character, but preferably, are of basic nature. Thus, acid catalysts may include mineral acids such as phosphoric or sulfuric acids, acid salts of these acids, zinc or ammonium chloride, naphthalene sulfonic acid, or the sulfonic acid type of ion-exchange resins. Basic catalysts would include lead oxide, the oxides, carbonates or carboxylic acid salts of the alkali and alkaline earth metals, including sodium carbonate or bicarbonate, calcium hydroxide, magnesium oxide, and the tertiary amines such as quinoline or triethanolamine. Also, basic ion exchange resins of the quaternary ammonium hydroxide type, may be used.

The basic catalysts are preferred since they do not encourage further resin condensation at elevated temperatures. Temperatures are conveniently chosen below 275° C. and with unsubstituted ethylene oxide, the reaction may take place at a slow rate at temperatures as low as 50° C. With catalysts, the speed of reaction is increased. A convenient temperature range in the absence of catalysts would be between 100° to 200° C. and when using catalysts, such range would be between 50° to 150° C.

In addition to ethylene oxide, other oxides may be used including propylene oxide, butylene oxide (1,2; 2,3 isomers and mixtures thereof), cyclohexene oxide, styrene oxide, hexyl ethylene oxide, paramethyl styrene oxide, hydroxymethyl ethylene oxide, and the like. Reactivity varies with the structure and as a general rule, decreases with increased substitution or increased size of the substituent group.

The reaction leads to replacement of the carboxyl groups by a hydroxyalkyl group, thus one carboxyl group is replaced by one hydroxyl group. If a substituted ethylene oxide such as glycidol (hydroxymethyl ethylene oxide) is employed, the terminal carboxyl group is replaced by a dihydroxyalkyl group. In this manner, the hydroxyl value is increased by twice the amount that the carboxyl value is reduced.

To illustrate the instant invention, the following examples are given.

*Example 1.*—A polyester derived from adipic acid, diethylene glycol and pentaerythritol, having an acid number of 14.6 and a hydroxyl number of 60.5 and in an amount of 770 grams was well mixed with 20 grams of butylene oxide (mixed 1,2 and 2,3 isomers) and heated with stirring under a reflux condenser at 240° C. for 4 hours. The end product showed an acid number of 1.0 and a hydroxyl number of 71.0.

*Example 2.*—800 grams of a polyester derived from succinic acid, triethylene glycol and trimethylolethane, having an acid number of 26 and a hydroxyl number of 58, was heated as in Example 1, to 235° C. with 40 grams of butylene oxide (mixed 1,2 and 2,3 isomers) and 1.0 gram of sodium carbonate. After 4.5 hours, the end product had an acid number of 1.3 and a hydroxyl number of 80.5.

*Example 3.*—780 grams of a polyester derived from maleic anhydride, succinic acid, trimethylolpropane and triethylene glycol, having an acid number of 15.4 and a hydroxyl number of 41.0, was mixed with 15 grams of propylene oxide (1,2 isomer) and 1.0 gram of sodium carbonate and heated to 185° C. under a reflux condenser at 78° C., for 5 hours. The end product had an acid number of 0.5 and a hydroxyl number of 50.8.

*Example 4.*—750 grams of a polyester derived from fumaric acid, phthalic anhydride, triethylene glycol, ethylene glycol and pentaerythritol, having an acid number of 91 and a hydroxyl number of 136, was heated under reflux to 195° C. with 95 grams of propylene oxide (1,2 isomer), and 0.5 gram of sodium carbonate, for 3.5 hours. The resulting product had an acid number of 1.0 and a hydroxyl number of 182.

*Example 5.*—740 grams of a polyester derived from ethylene glycol, propylene glycol and adipic acid, having an acid number of 12.3 and a hydroxyl number of 64.5, was heated to 135° C. with stirring, together with 12.3 grams of ethylene oxide, introduced as a vapor over a period of 3 hours. During this time, the temperature was allowed to rise steadily to 145° C. The end product had an acid number of 3.1 and a hydroxyl number of 70.

*Example 6.*—800 grams of a polyester derived from oxalic acid, phthalic anhydride, adipic acid, trimethylolpropane and pentaerythritol, having an acid number of 50, was heated to 125° C. while 50 grams of ethylene oxide in vapor form was introduced with stirring. The final temperature was 140° C. after 3 hours of reaction and at this point, the acid number of the product had dropped to 4.0.

*Example 7.*—600 grams of a polyester derived from adipic acid, diethylene glycol and trimethylolpropane, having an acid number of 14.0 and a hydroxy number of 50.0, was mixed with 20 grams of propylene oxide (substantially 230% of the theoretical stoichiometric amount calculated as aforesaid for completely reacting with the carboxyl groups) and heated to 175° C., together with 1.0 gram of sodium carbonate, for 3 hours. The end product had an acid number of 0.5 and a hydroxyl number of 67.5.

*Example 8.*—A polyester such as in Example 7 was heated to 178° C. for 3 hours with 3.5% by weight of propylene oxide. The end product had an acid number of 8 and a hydroxyl number of 55.

*Example 9.*—800 grams of a polyester derived from adipic acid, diethylene glycol, and glycerol, having an acid number of 24.6 and a hydroxyl number of 64.9, was heated with 37 grams of styrene oxide and 1.0 gram of sodium carbonate for 3.75 hours. The end product had an acid number of 2.2 and a hydroxyl number of 84.

*Example 10.*—800 grams of a polyester derived from phthalic acid, pimelic acid, ethylene glycol and propylene glycol, having an acid number of 35.5 and a hydroxyl number of 55.0, was heated with 30 grams of glycidol (substantially 80% of the theoretical stoichiometric amount calculated as aforesaid for completely reacting with the carboxyl groups) to 275° C. for 4 hours. The end product had an acid number of 0.5 and a hydroxyl number of 111.5.

Having thus disclosed our invention, we claim:

1. A method which comprises reacting a liquid polyester having a molecular weight of at least 1000 and an acid number substantially above 10 and not substantially above 100, said polyester being predominantly the product of esterification reaction between an organic dicarboxylic acid and a glycol, with an alkylene oxide selected from the group consisting of ethylene, propylene, butylene, cyclohexene, styrene and hydroxy methylethylene oxides in an amount ranging from about 80% to about 230% of the theoretical stoichiometric amount for completely reacting with the carboxyl groups of said polyester and at a temperature between about 50° C. and about 275° C., thereby effecting esterification of the carboxyl groups with formation of hydroxyalkyl ester groups, and continuing said reaction until the acid number of the polyester is reduced substantially below 10, the said reaction being discontinued while limited substantially to said esterification.

2. The method of claim 1 wherein the reaction is continued until the acid number is reduced to at most about 1.

3. The method of claim 1 wherein the reaction is conducted in the presence of a basic catalyst.

4. The method of claim 1 wherein the polyester is a linear polyester.

5. A method according to claim 1 wherein said polyester is predominantly the product of reaction between organic dicarboxylic acid and glycol in the presence of a minor amount of an organic polyhydroxy compound containing more than two hydroxyl groups.

6. A method according to claim 1 wherein said polyester consists essentially of the reaction product between adipic acid and triethylene glycol in the presence of a minor amount of pentaerythritol and wherein said alkylene oxide is butylene oxide.

7. A method according to claim 1 wherein the amount in excess of the alkylene oxide employed is approximately 20% of stoichiometric amount to completely react with the carboxyl groups of the polyester.

References Cited in the file of this patent

UNITED STATES PATENTS

| | | |
|---|---|---|
| 1,845,198 | Schmidt et al. | Feb. 16, 1932 |
| 1,883,182 | Webel | Oct. 18, 1932 |

OTHER REFERENCES

Ellis: Chemistry of Synthetic Resins, vol. II, page 899, Reinhold Pub. Corp., N. Y., 1935.

UNITED STATES PATENT OFFICE

CERTIFICATE OF CORRECTION

Patent No. 2,863,855 December 9, 1958

Christopher L. Wilson et al.

It is hereby certified that error appears in the printed specification of the above numbered patent requiring correction and that the said Letters Patent should read as corrected below.

Column 3, line 70, for "hydroxy" read -- hydroxyl --; column 4, lines 61 to 64, read as follows instead of as in the patent:

A method according to claim 1 wherein the amount of alkylene oxide employed is approximately 20% in excess of the stoichiometric amount to completely react with the carboxyl groups of the polyester.

Signed and sealed this 9th day of June 1959.

(SEAL)
Attest:

KARL H. AXLINE
Attesting Officer

ROBERT C. WATSON
Commissioner of Patents